3,151,096
HALOPHENOL DERIVATIVES AS VULCANIZING AGENTS FOR BUTYL RUBBER AND PROCESS OF VULCANIZATION
Stanley Kordzinski, Old Bridge, Peter A. Yurcick, South River, and James N. Mitchell, Linden, N.J., assignors to Catalin Corporation of America, a corporation of Delaware
No Drawing. Filed June 3, 1959, Ser. No. 817,721
8 Claims. (Cl. 260—38)

This invention relates to a process for vulcanizing diolefin polymers such as butyl rubber and similar synthetic rubbers, and to vulcanizing agents useful in this process, and to the vulcanizates thereby obtained, and, more particularly, to polycyclic p-halophenol compounds useful in the vulcanization of diolefin polymers, including butyl rubber, and to a process of vulcanizing such polymers with these compounds.

It is well known that the vulcanization of butyl rubber presents serious problems not encountered in the vulcanization of natural rubber and other synthetic rubbers. Sulfur is the conventional vulcanizing agent for both butyl rubber and natural rubber, but it is not satisfactory when used with butyl rubber.

Two competing reactions take place when sulfur is used as the vulcanizing agent, cross-linking, which is the process known as vulcanization, and the reverse reaction or rupture of the cross links, known as devulcanization. In the case of butyl rubber, reversion is a particularly serious problem, much more troublesome than with natural rubber. Due to reversion, a conventional butyl rubber vulcanized with sulfur loses 55% of its optimum stress at 200% elongation after heating at 322° F. for four hours in an inert atmosphere.

The development of other curing agents for butyl rubber has long occupied the art, and the special problems involved in curing butyl rubber are discussed in the technical and patent literature. Butyl rubber is known to have a very low degree of unsaturation compared with other vulcanizable rubbers. It is thought that this may be responsible for the difficulty in vulcanizing butyl rubber with sulfur and with other vulcanizing agents which are quite satisfactory with other rubbers.

Many years ago, phenol-formaldehyde polymers were investigated as vulcanizing agents for a natural rubber. However, they were not found to be better than sulfur, and this work was consequently abandoned. Recent work repeating these experiments has shown them to be substantially correct. Today, however, it is known that certain linear phenol-dialcohols are capable of vulcanizing butyl rubber more effectively than is sulfur.

It is now well accepted that the fact that a given vulcanizing agent is useful with other rubbers does not mean that it is useful with butyl rubber. Moreover, the fact that a particular vulcanizing agent is useful with butyl rubber does not imply that vulcanizing agents of similar structure will also be useful with butyl rubber, because small differences in structure can produce large differences in reactivity and effectiveness.

In accordance with the instant invention, a process of vulcanizing diolefin polymers is provided employing as novel vulcanizing agents phenol dialcohols and polymers thereof. The phenol dialcohols of the invention can be defined by the following general formula:

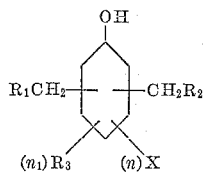

(I)

$R_1$ and $R_2$ are selected from the group consisting of hydroxyl OH, chlorine, ether $OR_4$ and ester $OOCR_4$ groups and at least one of $R_1$ and $R_2$ is selected to be other than the hydroxyl OH in such group.

The $R_3$ substituent attached to the ring is selected from the group consisting of hydrogen and organic hydrocarbon radicals having from one to thirty carbon atoms.

X is halogen, such as fluorine, chlorine or bromine.

$n$ is a number from 1 to 3, $n_1$ is a number from 0 to 2 and the sum and $n$ and $n_1$ is a number from 1 to 3. The significance of the coefficients $n$ and $n_1$ in the above Formula I, as well as in all subsequent formulas in which such coefficients appear, is that the sum of the number of $R_3$ groups attached to the ring and the number of X halogen atoms attached to the ring cannot exceed three but may be less. Thus, while there must always be at least one X halogen atom on the ring, in such case there may be zero, one or two $R_3$ groups and correspondingly the sum of $n$ and $n_1$ may vary from 1 to 3 as stated. When the value $n$ is 2 so that two halogen atoms are present, the only values possible for $n_1$ are 0 or 1 as there is only one open position which can be occupied by an $R_s$ group. Of course, when $n$ is 3, $n_1$ must be zero.

$R_3$, $CH_2R_1$, $CH_2R_2$ and X are positioned on the ring in such a way as to block the position ortho and para to the hydroxyl group.

These compounds readily polymerize to form linear polymers having the general structure:

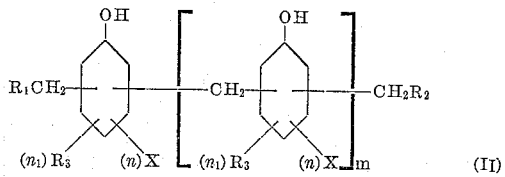

(II)

wherein $m$ is a number representing the number of units enclosed by the brackets in the chain, and $n_1$, $R_3$, $R_1$, $R_2$ and X are as before, in I.

The X, $R_3$, $CH_2R_1$, $CH_2R_2$ groups may be the same or different.

In the aliphatic ether $OR_4$ and ester $OOCR_4$ groups, $R_4$ can be any straight or branched saturated or unsaturated aliphatic hydrocarbon radical having from one to about eighteen carbon atoms. Typical groups are, for example, methyl, ethyl, propyl, isopropyl, butyl, tert-butyl, sec-butyl, amyl, nonyl, undecyl, tridecyl, pentadecyl, heptadecyl, oleyl, octadecyl, and hexenyl.

The $R_3$ substituent attached to the ring can be alkyl, alkylene, aryl, or cycloalkyl, for example, propyl, isopropyl, butyl, isobutyl, sec-butyl, t-butyl, amyl, isoamyl, t-amyl, hexyl, heptyl, octyl, 2-ethyl hexyl, isooctyl, tert-octyl, nonyl, isononyl, dodecyl, octadecyl, propenyl, hexenyl, octenyl, oleyl, decenyl, eicosyl, phenyl, benzyl, α-methyl benzyl, dimethylbenzyl, dimethylphenyl, tolyl, xylyl, cyclohexyl, cyclopentyl and naphthyl.

The $R_3$, X, $CH_2R_1$ and $CH_2R_2$ radicals attached to the benzene ring may have any position in the ring, provided that in each ring at least one of the $CH_2R_1$ and $CH_2R_2$ groups is ortho to the phenolic hydroxyl group, and the remaining positions ortho and para to the hydroxyl are blocked. This can be done by having X or an $R_3$ hydrocarbon group or the other of the $CH_2R_1$ and $CH_2R_2$ groups in these positions, or by having a group in an adjacent position large enough to sterically block the position. Hydrocarbon groups of four carbon atoms or more in a branched chain meet this requirement. In the preferred compounds, the $CH_2R_1$ and $CH_2R_2$ groups occupy the 2- and 6-positions, the $R_3$ radicals occupy the 3- and 5-positions, and the halogen X is para to the hydroxyl.

When $m$ is zero in II above, the compound is the monomer I. When $m$ is one, the compound is a dimer, and so forth. The methylene bridge between phenol units results from the elimination of $H_2O$ and the joining of a $CH_2OH$ group on one unit to the benzene ring of another unit not yet containing a $CH_2OH$ group:

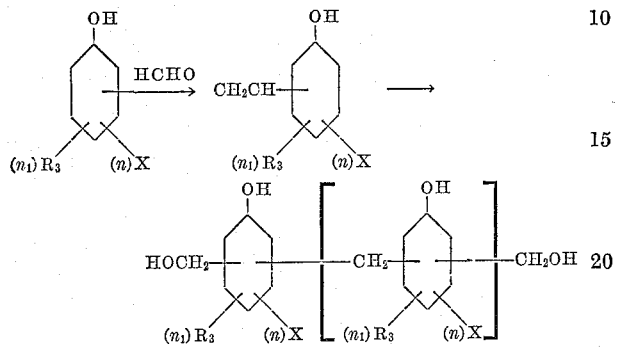

The above compounds in monomeric or polymeric form can self-condense to form higher polymers of the same general formula by elimination of HX (from $CH_2X$), ROH (from $CH_2OR$ and $CH_2OH$) and HOOCR (from $CH_2OOCR$). In a very minor proportion ether linkages of the type —$CH_2$—O—$CH_2$— may form between phenol nuclei.

It will be apparent from the above discussion that the monomers ($m$ is 0) fall into general classes which may be represented by the following, according to whether the $CH_2R_1$ and $CH_2R_2$ are hydroxyl, chlorine, ether or ester, and are the same or different:

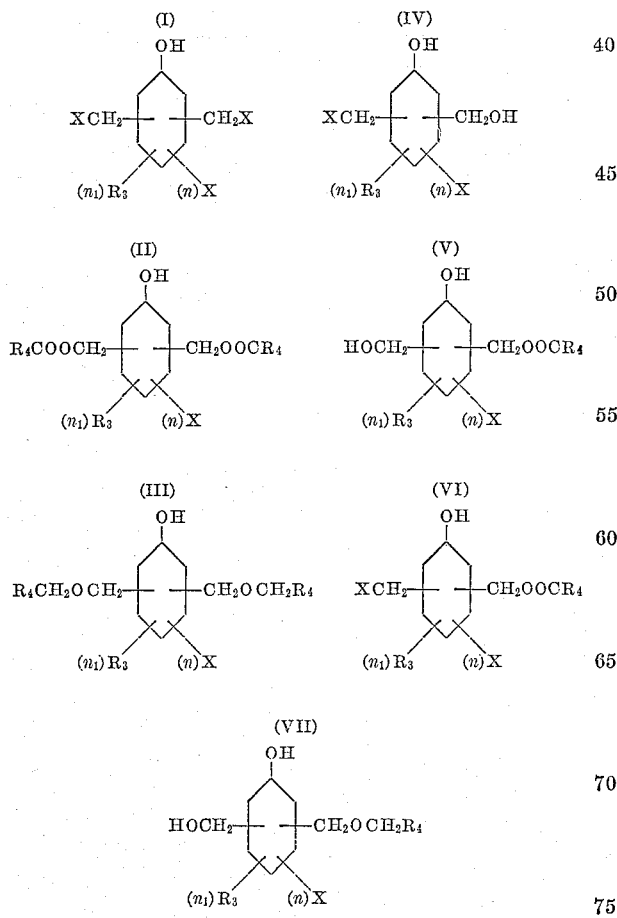

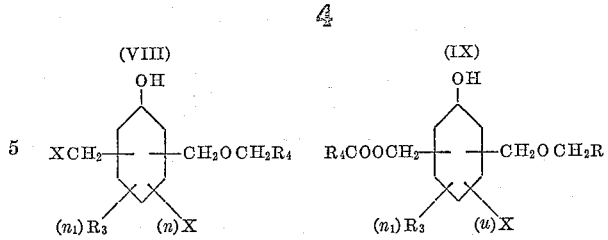

Compounds containing a mixture of $CH_2X$ and or $CH_2OR$ or $CH_2OOCR$ groups are preferred, because the $CH_2X$ groups impart a high vulcanizing activity to the compounds, and the other groups, being less highly activating, can give good control of the highly active $CH_2X$ groups. A compound containing only $CH_2X$ groups is frequently so active that vulcanization may begin early in the mixing, and a compound containing only the $CH_2OH$, $CH_2OR$ or $CH_2OOCR$ groups may be somewhat slow in activity, so that a proper blend of these can give just the activity desired.

The following compounds are typical of these groups:

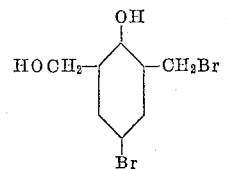

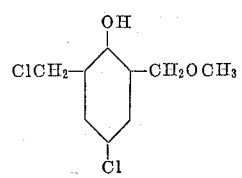

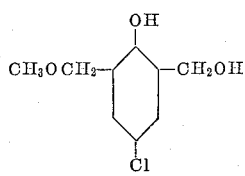

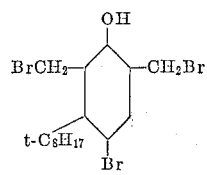

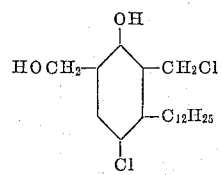

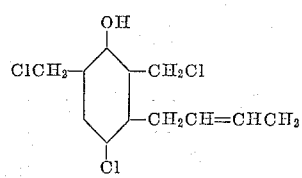

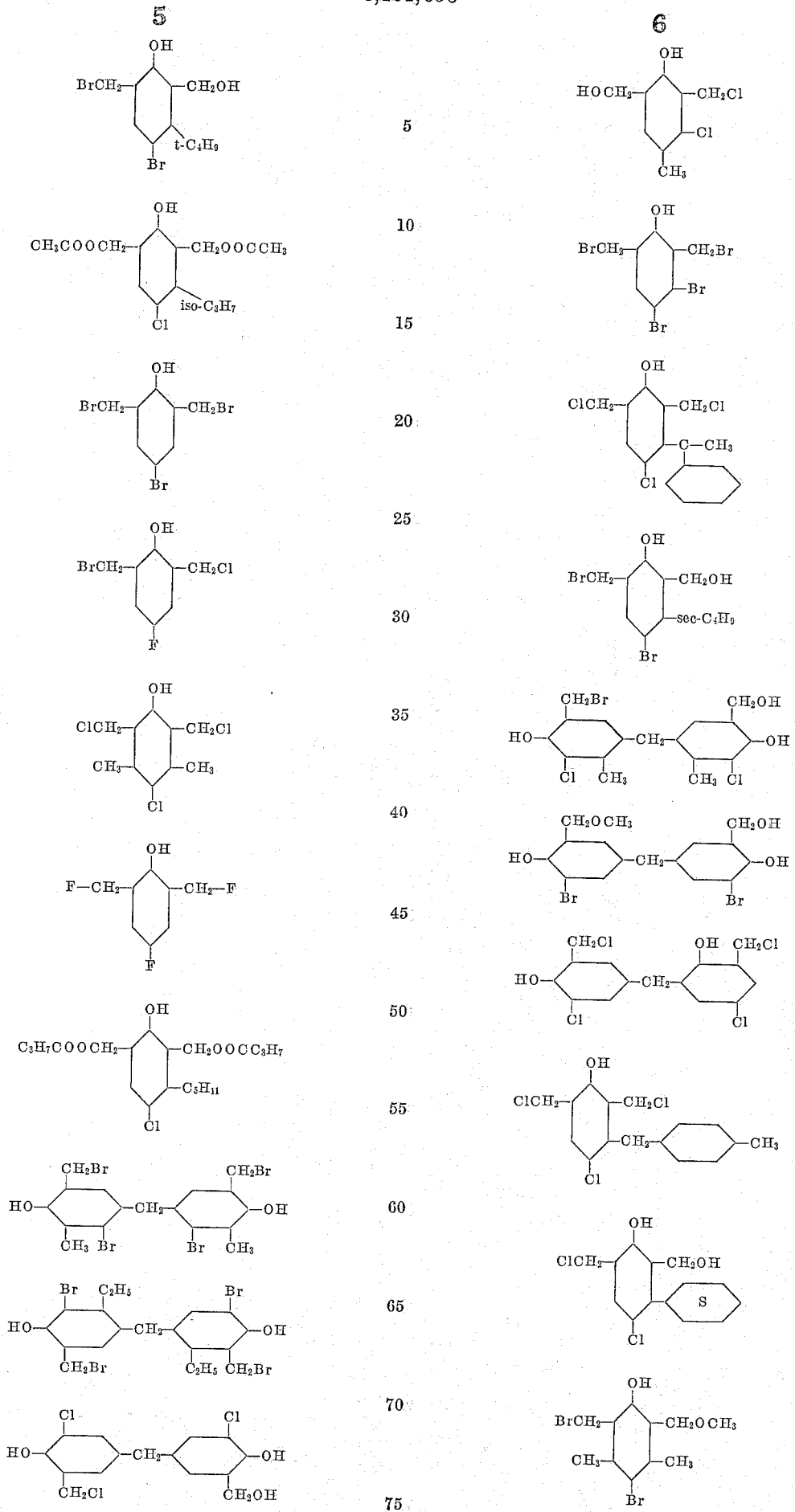

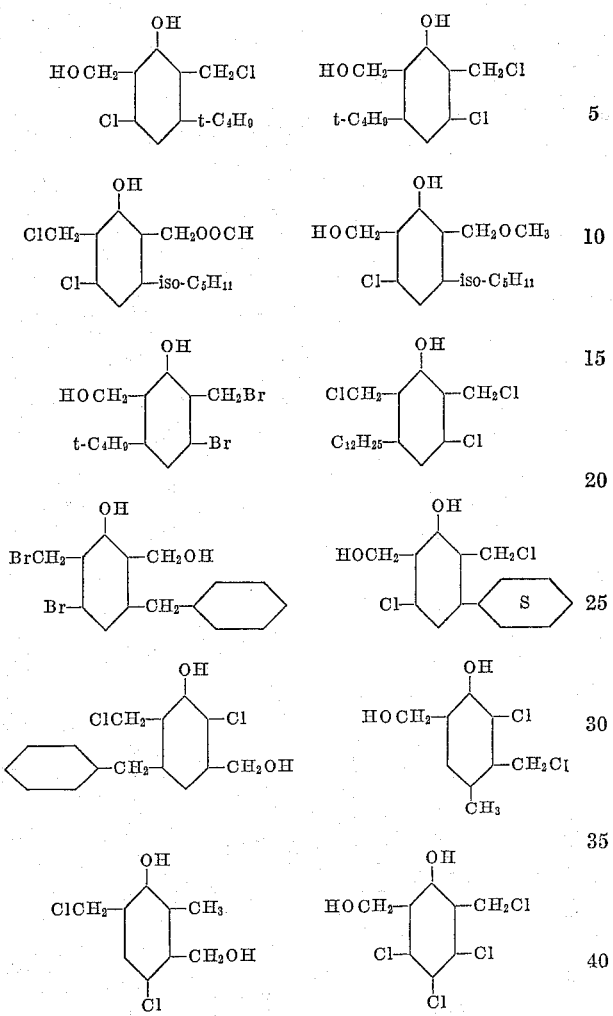

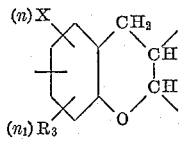

These compounds are prepared by the reaction of the corresponding phenol and formaldehyde in the presence of an alkali. The general reaction is described by Honel in U.S. Patent No. 1,996,069 and Charlton et al. in U.S. Patent No. 2,364,192.

The polymeric reaction products are distinguished from the Novolacs, which are made in an acid medium with less formaldehyde. The polymeric reaction products are not thermosetting because they have only two reactive positions, the third being blocked, and can therefore undergo only linear condensation. The monomer is first formed, and further condensation leads to a linear chain of $CH_2$-linked phenol units, and $m$ increases from one to a higher number, usually not in excess of twenty.

The condensation to form both monomer and polymer is effected by simple heating of the reactants at moderate temperatures from 25 to 110° C. under reflux or pressure if necessary to retain the reactants in the reaction mixture.

Under the moderate reaction conditions employed it is possible to limit $m$ to zero or one or a small number below about twenty. The compounds of lower molecular weight where $m$ is eight or below usually are more effective vulcanizing agents, probably because they have more reactive groups per unit weight than the higher polymers, and are better capable of undergoing condensation with the diolefin polymer before they can form long chains which have only few reactive positions per unit weight and therefore a greatly decreased vulcanization effectiveness per unit weight of vulcanizing agent. On the other hand, the dimer and some low polymers are better than the monomer, probably because the chain length of the latter is a little too short.

It is thought that these compounds in vulcanizing diolefin polymers react therewith at one OH and one $CH_2R$ group to form a chromane ring of the form:

where the $CH_2$ is derived from one of the $CH_2R$ groups and the O is derived from the hydroxyl group attached to the benzene ring of the phenol. The units are part of the polymer chain of the diolefin polymer.

It will be understood that the terms "phenol" and "phenol compound" as used herein are inclusive of the monomeric compounds and of the polymeric compounds described above. The reaction described will give a complex mixture of monomers and polymers, as set forth above, and therefore both types of the compounds would usually be used in admixture. The $m$ values in the formulae for the polymers are average values of all of the species of different chain length present.

The condensation reaction between the phenol and the formaldehyde will take place in the presence of the usual alkaline catalyst such as alkali metal hydroxides including sodium and potassium hydroxides. From 0.03 to 1.1 moles of alkaline catalyst is used per mole of phenol, and the amount of formaldehyde will be stoichiometric plus a slight excess. To prepare the monomer from the phenol, from 1.5 to 2.2 moles of formaldehyde are used per mole of phenol, 2 moles of formaldehyde reacting with each mode of phenol, as is evident from the formula for the compounds given above. The polymer is formed of phenol and formaldehyde in an approximately 1:1 ratio, and a smaller proportion of formaldehyde therefore can be used; the range will usually be from 1 to 2.2 moles of formaldehyde per mole of phenol.

The reaction is carried out in aqueous solution, desirably with an added water-miscible organic solvent to completely solubilize the phenol and alkaline catalyst in the reaction mixture, if not soluble in water, usually under reflux at atmospheric pressure, and is complete within from one to five hours.

If the product has precipitated from the reaction mixture in crystalline form, it can be separated by filtration or centrifuging before or after neutralization by acid. The polymeric products usually separate out as an oil phase, which is separated from the aqueous phase after the condensation neutralization by addition of acid, and the product can be extracted or dissolved in an organic solvent or washed with water to remove the salt resulting from the neutralization. The product then can be dehydrated under vacuum.

The conversion of the dimethylol compound to the partially halomethylated compound is carried out in solution in an inert organic solvent, such as toluene. The concentration of the dimethylol compound in the solution should be within the range from 10 to 90%. The dimethylol compound can be dissolved in the solvent by heating, up to the reflux temperature of the solvent, until solution is complete.

The hydrogen halide such as HCl or HBr is introduced into the reaction solution while the temperature is held within the range from about 25 up to about 100° C. or the reflux temperature of the solvent mixture. The solution should be saturated with the gas. The rate of addition will depend upon the speed of the reaction, and will usually be within the range from 1 to 12% by weight of the resin charge per hour. Addition of gas is stopped when the desired amount of hydrogen halide has been introduced, as determined by sampling the reaction mixture and analyzing the samples. In order to arrest the halomethylation at this stage, the reaction mixture can be purged of unreacted gas by blowing a stream of air through it.

One mole of water is formed for each mole of hydrogen halide reacted. This water is removed usually with unreacted hydrogen halide to be deposited in the scrubbers. However, some concentrated aqueous hydrogen halide solution may be retained in the product and this is not harmful. The formation of water and the effect of the aqueous acid solution can be limited or eliminated by incorporating anhydrous sodium sulfate in the reaction mixture.

The final reaction product is separated from acid and other extraneous materials and washed two or three times until the pH is higher than about 2.5. The organic solvent can be removed by distillation.

The ether and ester $CH_2OR$ and $CH_2OOCR$ groups are readily formed from the methylol $CH_2OH$ or halomethyl $CH_2X$ compound by conventional procedures of etherification and esterification, respectively, as illustrated in the working examples.

The invention is applicable to any diolefin polymer. The diolefin preferably is conjugated. Butyl rubber is an outstanding example of such polymers. As is well known, butyl rubber is prepared by copolymerizing an isoolefin such as isobutylene with a minor proportion of a diolefinic compound such as a conjugated diolefin, e.g., isoprene or butadiene. The isoolefins have from about four to about seven carbon atoms, such as not only isobutylene but also ethylmethylethylene, diethylene, and ethylpropylethylene. The diolefins have from about four to about fourteen carbon atoms and include dienes, in addition to isoprene and butadiene, such as 2-ethyl-pentadiene-1,3, 2,4-hexadiene, 1,3-hexadiene, 3-methyl-pentadiene-1,3, piperylene, 1-ethyl-1,3-butadiene, 2,3-dimethyl-butadiene-1,3, 1,2-dimethyl-butadiene-1,3, and 1,4-dimethyl-butadiene-1,3. Most butyl rubbers contain only small amounts of copolymerized diene, usually from 0.5 to about 10%.

The invention also is applicable to the vulcanization of halogenated diolefin polymers such as polychloroprene, i.e., neoprene and polyfluoroprene, butadiene homopolymers, copolymers of butadiene and methyl acrylate, copolymers of butadiene and acrylonitrile, and copolymers of styrene and butadiene, whether made by the cold or hot processes, formerly known as GRS synthetic rubbers and now as SBR synthetic rubbers.

For convenience and brevity all of the above polymers, whether made by copolymerization of the diolefin with another unsaturated compound, or by homopolymerization of the diolefin, are hereinafter referred to and defined in the specification and claims by the term "a rubbery polymer of a diolefin having from about four to about fourteen carbon atoms."

The amount of vulcanizing agent that is used will depend upon that needed to effect a complete cure, and this will vary with the effectiveness of the compounds and with the diolefin polymer. Usually a good cure can be obtained employing as little as 0.5% by weight of the butyl rubber. The optimum cures are obtained using amounts within the range from 3% to 20% by weight of the resin. Amounts in excess of 20% can be used, but may result in an overcure, and in any event would usually be wasteful.

The vulcanizing agents of the invention are capable of vulcanizing diolefin polymers in the absence of any filler and such products have many useful properties. It is, however, generally preferred to vulcanize the polymer in the presence of a filler such as carbon black, channel black, furnace black and acetylene black, or, if a light-colored stock is desired, silica. The amount of filler usually is within the range from about 20 to about 100 parts by weight per 100 parts of polymer.

There can also be incorporated a catalyst which accelerates the rate of cure. A very small amount will be effective, usually from 0.25 to about 5% by weight of the polymer. Zinc oxide and ferric oxide are mild catalysts. Stannous chloride and ferric chloride have a stronger catalytic activity. These salts may if desired be used in the form of their hydrates. Chlorosulfonated polyethylenes also are effective.

If the vulcanizing agent of the invention contains a sufficient proportion of $CH_2X$ groups, however, a catalyst may not be needed, because of the activating effect of such groups, as stated above. Zinc and ferric oxides are usually used with compounds containing $CH_2X$ groups, when a catalyst is needed, and the halogenated catalysts are used with the other hydroxy, ether and ester compounds.

These compounds may form the corresponding salt of the phenol. The salts are solids, whereas the phenols may be very viscous liquids or sticky solids, which are harder to handle than the salts. Hence, these may raise the melting point of the phenol, and at the same time give a better cure. If desired, the salt of the phenol can be formed before incorporating the latter in the composition to be vulcanized.

The composition to be vulcanized is prepared by blending the diolefin polymer, phenol monomer or polymer and any additional optional ingredients including the filler, plasticizer, catalyst and the like, in any convenient manner used in this art. A mill or an internal mixer can, for example, be used. The compounded material is then formed in the desired shape and vulcanized.

If the vulcanizing agent and rubber are sufficiently reactive, vulcanization can quickly be effected even at room temperature or slightly above up to about 50° C. More inactive systems require an elevated temperature, usually within the range from about 50 to about 250° C. Temperatures within the range from about 125 to about 200° C. are preferred.

The vulcanization may be carried out in a mold under pressure or in an open container at the temperature and for the time required to effect the cure. In most cases, cure is complete within from one-quarter to twenty-four hours. In general, the higher the curing temperature, the more quickly the cure will be effected.

The following examples in the opinion of the inventors represent the best embodiments of their invention.

*Example 1*

1426 g. p-chloro-m-cresol (10 moles), 1500 g. 44% methanol-free formaldehyde (22 moles) and 420 g. 100% sodium hydroxide (10.5 moles), added as a 25% aqueous solution, were reacted at 70° C. for thirty minutes with agitation. The molar ratio of p-chloro-m-cresol to formaldehyde was 1:2.20, and the molar ratio of p-chloro-m-cresol to sodium hydroxide was 1:1.05. After reaction was complete the reaction mixture was neutralized by addition of 1500 ml. of water and 662 g. of 100% acetic acid, added as 80% aqueous acetic acid. Agitation was then stopped and the aqueous layer permitted to separate, after which it was drawn off by siphoning. The condensation product which was collected was washed with several portions of water and a small amount of 99% isopropyl alcohol to remove sodium acetate and traces of any unreacted p-chloro-m-cresol. The washed product was dried at 50 to 60° C. The yield was 1834 g. or 90.5% of theory.

The product was buff to yellow color in appearance, and its melting point was from 129 to 130° C. It contained 30.44% methylol groups (30.5% calculated), 18.05% chlorine (17.5% calculated), 0.23% ash and 0.00% alkali. It therefore corresponded to the monomer, of the structure:

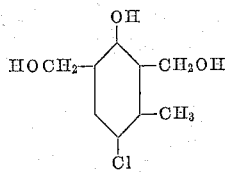

This vulcanizing agent was evaluated as a vulcanizing agent for butyl rubber and SBR rubber (styrene-butadiene rubber) using the following compositions:

| Composition | Parts by Weight | Ingredients |
|---|---|---|
| A | 100 | Styrene-butadiene rubber. |
|   | 50  | Carbon black. |
|   | 1   | Stearic acid. |
|   | 10  | Vulcanizing agent. |
| B | 100 | Styrene-butadiene rubber. |
|   | 50  | Carbon black. |
|   | 1   | Stearic acid. |
|   | 4   | Stannous chloride. |
|   | 10  | Vulcanizing agent. |
| C | 100 | Butyl rubber. |
|   | 50  | Carbon black. |
|   | 1   | Stearic acid. |
|   | 4   | Stannous chloride. |
|   | 10  | Vulcanizing agent. |

The compositions were prepared for vulcanizing by mixing the rubber with the stannous chloride and carbon black at 340° F. for a total of five minutes, allowing the batch to rest for four hours, and then adding the p-chloro-m-cresol dialcohol at 240° F. and mixing for a total of four minutes. The stock was transferred to a laboratory mill, and blended and sheeted out and cured at 340° F. for forty-five minutes. The rate of cure of these compositions was as follows:

Composition: Rate of cure
A _____ 1
B _____ 1
C _____ 3

In this test, the rate of cure decreases with increasing number, No. 1 being the fastest. In a comparable series of experiments, in all three compositions crystalline cyclohexyl phenol dialcohol had a rating of 5, crystalline p-phenyl phenol dialcohol had a rating of 6, and p-tert-amyl phenol dialcohol had a rating of 3, 3 and 1, respectively.

The tensile development, running temperature and hot ring tear at 212° F. also were determined, with the following results:

| Composition | Tensile Development | Running Temperature | Hot Ring Tear |
|---|---|---|---|
| A | 3,500 | 233 | 114 |
| B | 3,000 | 240 | 140 |
| C | 1,600 | 240 | 146 |

*Example 2*

925 g. of p-chlorophenol (7.19 moles), 1078 g. of 44% methanol-free formaldehyde (15.79 moles), 316 g. 100% sodium hydroxide (7.90 moles), added as a 25% solution, and 300 ml. of water were reacted at 70° C. for one and one-quarter hours with agitation. The molar ratio of the p-chlorophenol to formaldehyde was 1:2.20, and the molar ratio of the p-chlorophenol to sodium hydroxide was 1:1.10. The reaction product was cooled to 40° C. and neutralized with 475.6 g. of 100% acetic acid, added as an 80% aqueous solution. Agitation was continued for thirty minutes to ensure proper neutralization. The neutralized, crude 2,6-dimethylol-p-chlorophenol was collected by filtration, and washed with several portions of water and a small amount of 99% isopropyl alcohol to remove sodium acetate and traces of unreacted p-chlorophenol. The crude washed product was dried, and 909 g. of dried material recovered, corresponding to 67% of theory. The product was a fine, buff colored powder having a melting point of 152-153° C., containing 32.85% methylol groups (32.87% calculated), 0.24% ash. The product accordingly corresponded to the following structure:

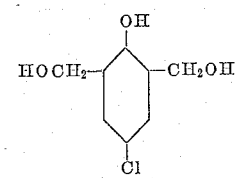

This compound when tested in the three formulations described in Example 1 gave excellent rates of cure, and the final vulcanizates had quite satisfactory properties.

*Example 3*

114.0 g. of p-bromo-m-t-octyl-phenol (0.4 mole), 60 g. of 44% methanol-free formaldehyde (0.879 mole), 16.8 g. of 100% sodium hydroxide (0.42 mole) added as a 25% aqueous solution and 649. g. 95% ethyl alcohol were reacted at 70° C. for three hours with agitation. The molar ratio of the p-bromo-m-t-octyl-phenol to formaldehyde was 1:2.20 and the molar ratio of the p-bromo-m-t-octyl-phenol to sodium hydroxide was 1:1.05.

The reaction product was cooled to 55° C. with water and vacuum dehydration and neutralized with 25.2 g. of 100% acetic acid added as an 85% aqueous solution. Agitation was continued for forty-five minutes at 55° C. to ensure complete neutralization and then stopped and the aqueous layer permitted to separate. The layer was drawn off by decantation and the resinous condensation product washed four times with four 100 ml. portions of water to remove sodium acetate salt, the mixture being allowed to settle after each washing to remove the aqueous layer.

The washed resin was vacuum dehydrated to a temperature of 120-135° C. at 28 inches vacuum and poured into a metal tray to cool. The final yield was 120 g.

The product was a mixture of monomeric and polymeric methylol phenols having the formula:

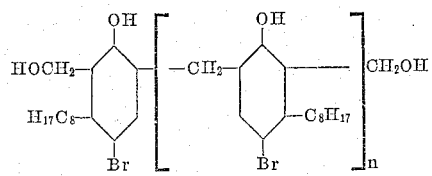

The product was dark violet to black in appearance, and contained a percent methylol groups corresponding to $n$ of the average value of about 2.

The above vulcanizing agent was evaluated for its ability to vulcanize butyl rubber by mixing into a butyl rubber composition having the following formulation:

| Ingredient: | Parts by weight |
|---|---|
| Butyl rubber (GRI-217) | 100 |
| Hypalon S-2 (chlorosulfonated polyethylene catalyst) | 3 |
| Carbon black (HAF black) | 50 |
| Zinc oxide | 3 |
| Vulcanizing agent | 10 |
|  | 166 |

The batch was made by mixing the butyl rubber and the chlorosulfonated polyethylene in a Banbury mixer. After one-half minute of mixing, one-half of the carbon black was added, and the remainder of the carbon black added after two and one-half minutes. The mixing was finished in another two and one-half minutes, and the batch dumped and allowed to rest for four hours.

The batch was then loaded into the Banbury mixer and zinc oxide added after one-half minute of mixing, followed by the vulcanizing agent. After one and one-half minutes of mixing the temperature was brought to 240° F. in two and one-half minutes and the batch then dumped, transferred to a laboratory mill, blended and sheeted out. The sheeted stock was allowed to age before curing.

The aged stock was cured for five, ten, twenty and forty minutes at 340° F. The vulconizate had quite satisfactory properties, and the rate of cure was good.

*Example 4*

1000 g. of p-chlorophenol (7.78 moles), 1170 g. 44% methanol-free formaldehyde (17.14 moles), and 60 g. of 100% sodium hydroxide (1.5 moles), added as 25% aqueous solution, were reacted under atmospheric reflux for 61 minutes with agitation. The molar ratio of p-chlorophenol to formaldehyde was 1:2.20, and the molar ratio of p-chlorophenol to sodium hydroxide was 1:0.193. The resinous condensation product was cooled to 50° C., and 90 g. of 100% acetic acid was added, as an 80% aqueous solution, to neutralize the catalyst. Agitation was continued for at least thirty minutes to ensure complete neutralization. The reaction mixture was allowed to stand until the aqueous layer had separated out, and this was then separated by decantation.

The neutralized product was washed at 50 to 60° C. with five 450 ml. portions of water to remove sodium acetate. The washed product was dehydrated under vacuum to a resin temperature of 135 to 140° C. under 28 inches vacuum, and the dehydrated resin held at this temperature and pressure with agitation until a Nagel melting point of 82° C. was obtained. The dehydrated product was poured into a metal tray to cool.

The yield was 1070 g. The product was a hard, red, transparent lump resin having a specific gravity of 1.424. It analyzed 19.1% methylol groups and 0.13% ash. The product accordingly corresponded to the following formula:

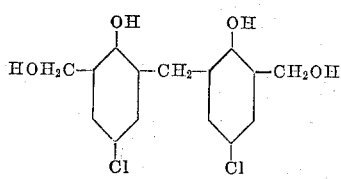

This product when used to vulcanize the three compositions of Example 1 gave an excellent rate of cure, and the vulcanizate had very satisfactory physical properties.

*Example 5*

3000 g. of p-chloro-m-cresol (21.04 moles), 2871 g. 44% methanol-free formaldehyde (42.07 moles) and 150 g. triethylamine (1.48 mole) were reacted at atmospheric reflux for two and one-half hours with agitation. The molar ratio of p-chloro-m-cresol to formaldehyde was 1:2.0, and the catalyst concentration was equivalent to 50 parts/1000 parts of p-chloro m-cresol.

After the condensation reaction was complete the product was vacuum dehydrated to a temperature of 135° C. at 28 inches vacuum. It was not necessary to neutralize or wash this condensation product because a volatile amine was utilized as a catalyst. The dehydrated product was held at 135° C. at 28 inches vacuum until a Nagel melting point of 70–90° C. was obtained. The product was poured on a metal tray to cool.

The cooled product was a brilliant red, transparent, hard resin. The yield was 3820 g., and the resin contained 15.5% $CH_2OH$ groups, had a specific gravity of 1.343, and a Nagel melting point of 73° C.

The composition of the product was essentially as follows:

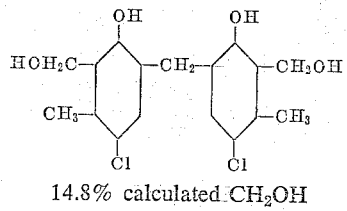

14.8% calculated $CH_2OH$

*Example 6*

400 g. of the product of Example 1 was slurried in 400 ml. toluene. 42 g. anhydrous $Na_2SO_4$ was added and dry HCl was added to the above at a temperature of 78–85° C. for three hours and ten minutes.

600 ml. of water was added to the crude chloromethylated product and the entire contents of the flask were diluted 200% with toluene. The diluted product was washed three times with water and vacuum dehydrated to 140° C. at 28 inches vacuum. The resinous chloromethylated product was poured on a metal tray to cool. The yield was 325 g., and the resin contained 26.86% Cl and 7.57% $CH_2OH$. The product was a red low melting solid resin of the formula:

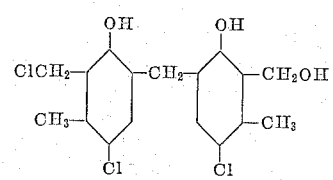

*Example 7*

500 g. of 4-chloro-3,5-xylenol (3.19 moles) was mixed with 1000 g. water, 260 g. of 100% sodium hydroxide (6.5 moles) and 500 g. of 44% formaldehyde (7.33 moles) and allowed to stand at room temperature for two days. The sodium salt of the dialcohol was filtered off and then redissolved in a minimum amount of water. 960 g. of 20% acetic acid were added and allowed to stand for one hour. The liberated dialcohol was filtered, washed with 300 ml. of water and then slurried with 750 ml. of water and refiltered. The isolated product was then dried under vacuum at 30° C. A yield of 75% of theory was obtained.

Capillary melting point, 161–164° C. (with decomposition). Percent methylol groups, 28.49. Percent chlorine, 16.30.

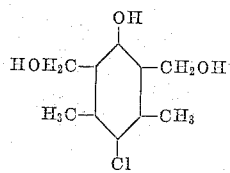

*Example 8*

660 g. of the product of Example 1, 2,6-hydroxymethyl-3-methyl-4-chlorophenol, and 2300 ml. of glacial acetic acid saturated with dry hydrogen bromide were stirred until solution was obtained and then the solution was saturated with hydrogen bromide once more and allowed to stand at room temperature for two hours. The mixture was cooled to 0 to −5° C. and filtered. The crystals were dried over calcium chloride and solid sodium hydroxide followed by crystallization from petroleum ether. 330 g. of the 2,6-dibromomethyl derivative was obtained.

Percent bromomethyl groups=56.0 (found); 57.22 (theory).

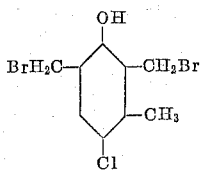

Example 9

160 g. of the product of Example 8, 2,6-bromomethyl-3-methyl-4-chlorophenol, was dissolved in 900 ml. of methanol and then 1 ml. of pyridine was added. The resultant solution was refluxed for ten hours. The methanol was then removed by vacuum distillation. The residue was then washed with water. The washed residue was dissolved in 400 ml. of benzene. The benzene solution was charcoaled and then the benzene was removed by vacuum dehydration.

Calculated percent $CH_2OCH_3$=39.03; Found=37.9.

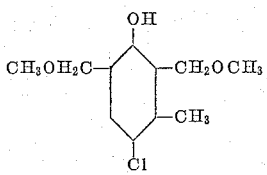

Example 10

164.25 g. of the product of Example 8, 2,6-bromomethyl-3-methyl-4-chlorophenol (0.5 mole), in 250 ml. of acetone was reacted with 75 g. of sodium formate (1.1 moles) at room temperature for twenty-four hours with agitation. The precipitated NaBr was removed by filtration, and the acetone was removed by vacuum distallation. The residue contained the crude 2,6-formoxymethyl-3-methyl-4-chlorophenol.

Saponification equivalent=129.3 calculated; 136.1 found.

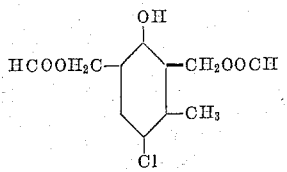

Example 11

132 g. of the product of Example 2, 2,6-hydroxymethyl-4-chlorophenol, dissolved in 250 ml. of glacial acetic acid was saturated with dry HCl gas at room temperature. The product crystallized, and was recovered by filtration. The crude product was recrystallized from a mixture of ethyl acetate and petroleum ether. The product had a melting point of 100–103.5° C.

Saponification equivalent=131.5 (found); 124.5 (calculated).

Percent Cl=28.5 (calculated); 28.2 (found).

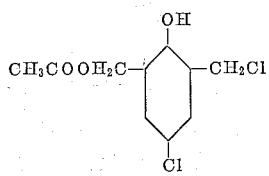

Example 12

375 g. of the product of Example 6, (1 mole) was dissolved in 4000 ml. of acetone. 75 g. of sodium formate (1.1 moles) was added, and the contents were reacted for twenty-four hours at ambient temperature with agitation. The NaCl was removed by filtration, and the acetone was removed by vacuum distillation at 5 mm. Hg. The residue was poured onto a Pyrex glass tray, and placed in a vacuum oven at 40° C. to remove last traces of solvent. 400 g. of a reddish, resinous material was recovered, containing 7.3% $CH_2OH$ and having a saponification equivalent of 410.

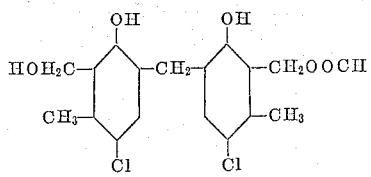

Example 13

375.7 g. of the product of Example 6, (1.0 mole) was dissolved in 2000 ml. of $CH_3OH$. 90 g. of $NaHCO_3$ were slurried in the resultant solution, and the reactants were refluxed for eight hours. 1000 ml. of methanol and water were removed by vacuum distillation and 1000 ml. of dry methanol was added. The sodium chloride was removed by filtration, and the filtered reaction solution was concentrated to dryness under vacuum. The viscous product contained 7.9% $CH_2OH$ and 11.6% $CH_2OCH_3$.

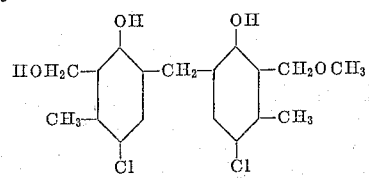

Example 14

249 g. of the product of Example 11, (1 mole) was dissolved in 1200 ml. of n-butyl alcohol. The resultant solution was gently refluxed for five hours using an air condenser which permitted the liberated HCl to escape. The unreacted butanol was removed by vacuum distillation. The recovered viscous product had a saponification equivalent of 290.

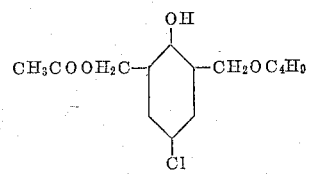

Example 15

458.2 g. of 3-tert-butyl-5-bromophenol (2.0 moles), 300 g. of 44% methanol-free formaldehyde (4.4 moles) and 21 g. of triethylamine (0.2 mole) was reacted at atmospheric reflux for two and one-half hours with agitation.

The condensation product was dehydrated under reduced pressure to a finishing temperature of 125° C. at 28 inches vacuum. The product was poured on a metal tray to cool. The cooled product had the following analysis:

Nagel softening point=76° C.; percent $CH_2OH$=11.3.

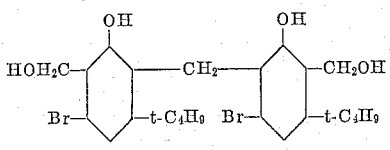

Example 16

1975 g. of 3,4,5-trichlorophenol (10 moles), 1500 g. of 44% formaldehyde (22 moles), and 420 g. of 100% sodium hydroxide (10.5 moles) added as a 10% solution was allowed to react at 70° C. for one hour and thirty minutes with agitation. The molar ratio of 3,4,5-trichlorophenol to formaldehyde was 1:2.20 and the molar ratio of 3,4,5-trichlorophenol to sodium hydroxide was 1:1.05.

The reaction mixture was cooled to 45° C., and neutralized with 630 g. of 100% acetic acid added as an 80% solution. Agitation was continued for thirty minutes. The neutralized crude 2,6-dimethylol-3,4,5-trichlorophenol was filtered off and washed with several portions of water and a small amount of 99% isopropyl alcohol to remove sodium acetate and unreacted 3,4,5-trichlorophenol. The washed product was dried and 1930 g. of dried material was obtained, corresponding to 75% of theory. The product gave the following analysis:

Capillary M.P., °C.=145.1–146.7; percent methylol groups=22.43%; percent chlorine=41.1.

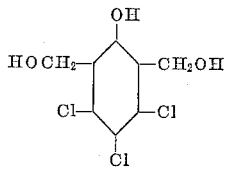

*Example 17*

885.5 g. of 3,4-dichloro-5-methyl phenol (5 moles), 750 g. of 44% formaldehyde (11 moles), 52.5 g. of 100% triethylamine (0.5 mole) added as a 10% solution was allowed to react at reflux for one hour and thirty minutes with agitation. The molar ratio of 3,4-dichloro-5-methyl phenol to formaldehyde was 1:2.20 and the catalyst concentration was equivalent to a mole ratio of 1:0.10 based on the phenol.

The resinous product was dehydrated under vacuum to a final temperature of 123° C. and 25 mm. Hg pressure. The molten product was poured into a glass tray and allowed to cool. 1090 g. of a red-black product was obtained. The following analysis was found:

Nagel softening point, °C.=90.1; percent methylol groups=14.0.

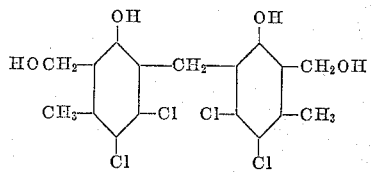

*Example 18*

594.4 g. of bis(4-hydroxy-5-chloro-6-methyl phenyl) methane (2 moles) and 300 g. of 44% formaldehyde (4.4 moles) was reacted in the presence of trimethyl isopropanol ammonium hydroxide (26.8 g.) (0.2 moles) added as a 10% solution for three hours and fifteen minutes.

The resinous product was dehydrated under vacuum to a final temperature of 128° C. and 25 mm. Hg pressure to yield 630 g. of product which was poured into a tray and allowed to cool. The following analysis was obtained on the dark red friable solid:

Nagel softening point, °C=92.1; percent methylol groups=7.9.

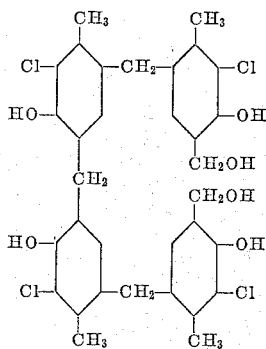

Each of the compounds of Examples 7 to 18 when used to vulcanize the three compositions of Example 1 gave an excellent rate of cure, and the vulcanizate had very satisfactory physical properties.

We claim:
1. Phenol compounds having the formula:

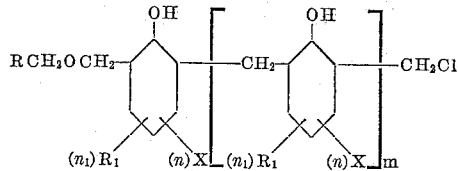

wherein R is selected from the group consisting of hydrogen and aliphatic hydrocarbon radicals having from one to eighteen carbon atoms, $R_1$ is an organic hydrocarbon radical having from one to twenty carbon atoms, X is a halogen selected from the group consisting of fluorine, chlorine and bromine, $n$ is a number from 1 to 3, $n_1$ is a number from 0 to 2 and the sum of $n$ and $n_1$ is a number from 1 to 3, at least one of X and $R_1$ occupies a position which renders the para position to the phenolic hydroxyl group nonreactive and $m$ is a number having a value starting with zero up to about twenty.

2. A vulcanizable composition comprising an unvulcanized rubbery polymer of a diolefin having from four to about fourteen carbon atoms and in mixture therewith a vulcanizing agent in accordance with claim 1.

3. A vulcanizable composition in accordance with claim 2 which includes a filler in an amount within the range from 10 to 50% by weight of the composition.

4. A vulcanizable composition in accordance with claim 3 in which the filler is carbon black.

5. An elastic vulcanizate comprising a vulcanized polymer of a diolefin having from about four to about fourteen carbon atoms which has been vulcanized with the aid of a vulcanizing agent in accordance with claim 1.

6. An elastic vulcanizate in accordance with claim 5 in which the diolefin polymer is a copolymer of an isoolefin having from four to seven carbon atoms with form 0.5 to about 10% of a conjugated diolefin having from four to eight carbon atoms.

7. Phenol compounds having the formula:

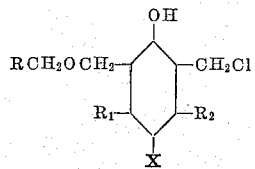

wherein R is selected from the group consisting of hydrogen and aliphatic hydrocarbon radicals having from one to eighteen carbon atoms, $R_1$ and $R_2$ are selected from the group consisting of hydrogen and organic hydrocarbon radicals having from one to twenty carbon atoms, and X is a halogen selected from the group consisting of fluorine, chlorine and bromine.

8. A vulcanizable composition comprising an unvulcanized rubbery polymer of a diolefin having from about four to about fourteen carbon atoms and in mixture therewith a vulcanizing agent in accordance with claim 7.

References Cited in the file of this patent

UNITED STATES PATENTS

| | | |
|---|---|---|
| 2,590,816 | Faith | Mar. 25, 1952 |
| 2,695,894 | D'Alelio | Nov. 30, 1954 |
| 2,797,204 | Shepard et al. | June 25, 1957 |
| 2,809,999 | Chiddix et al. | Oct. 15, 1957 |
| 2,829,123 | Tawney | Apr. 1, 1958 |
| 2,830,970 | Tawney | Apr. 15, 1958 |
| 2,918,448 | Viohl | Dec. 22, 1959 |

(Other references on following page)

UNITED STATES PATENTS

| 2,972,600 | Braidwood | Feb. 21, 1961 |
| 2,987,497 | Leshin | June 6, 1961 |
| 3,039,978 | Fusco et al. | June 19, 1962 |

OTHER REFERENCES

Finn et al., Jour. Applied Chem., vol. 1, pages 524–526 (1951), (3 pp.),

Strating et al., 39 Chemical Abstracts, 2497–8 (1945) (1 p.).

Van der Meer, "Rubber Chemistry and Technology" vol. 18, pages 583–873.

Van der Meer, "Rubber Chemistry and Technology" vol. 18, page 856 (1945).

Zink et al., "Deutsche Chemische Gesellschaft," vol. 74B, pages 211–212.

UNITED STATES PATENT OFFICE
CERTIFICATE OF CORRECTION

Patent No. 3,151,096                                  September 29, 1964

Stanley Kordzinski et al.

It is hereby certified that error appears in the above numbered patent requiring correction and that the said Letters Patent should read as corrected below.

Column 2, line 27, for "position" read -- positions --; line 42, for "$n_1$, $R_3$, $R_1$, $R_2$" read -- n, $n_1$, $R_3$, $R_1$, $R_2$ --; column 3, lines 10 to 23, the upper right-hand portion of the formula should appear as shown below instead of as in the patent:

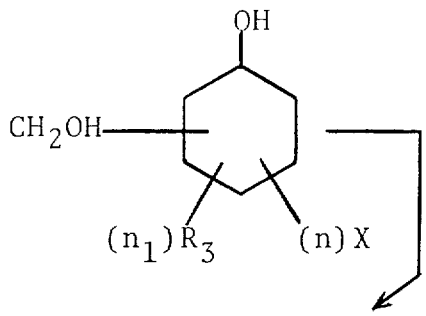

column 4, lines 1 to 8, formula (IX) should appear as shown below instead of as in the patent:

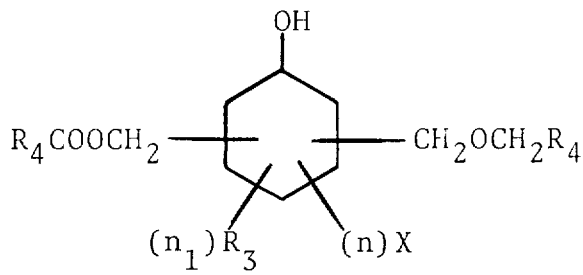

same column 4, line 11, for "$CH_2X$ and or" read -- $CH_2X$ and $CH_2OH$ or --; same column 4, line 18, strike out "$CH_2OH$,"; column 11, line 75, for "unrected" read -- unreacted --; column 12, line 23, for "649." read -- 64.9 --; column 13, line 9, for "vulconizate" read -- vulcanizate --; column 18, line 41, for "form" read -- from --.

Signed and sealed this 23rd day of November 1965.

(SEAL)
Attest:

ERNEST W. SWIDER                        EDWARD J. BRENNER
Attesting Officer                      Commissioner of Patents